(12) United States Patent
Adams et al.

(10) Patent No.: US 8,915,306 B2
(45) Date of Patent: Dec. 23, 2014

(54) UNIVERSAL FARRIER'S HOOF AND CRADLE SUPPORT STAND

(76) Inventors: Rozanne E Adams, Joseph, OR (US); Alan Dale, Joseph, OR (US)

(*) Notice: Subject to any disclaimer, the term of this patent is extended or adjusted under 35 U.S.C. 154(b) by 159 days.

(21) Appl. No.: 13/532,643

(22) Filed: Jun. 25, 2012

(65) Prior Publication Data
US 2012/0325501 A1 Dec. 27, 2012

Related U.S. Application Data

(60) Provisional application No. 61/500,677, filed on Jun. 24, 2011.

(51) Int. Cl.
*A01L 11/00* (2006.01)
*A01L 15/00* (2006.01)

(52) U.S. Cl.
CPC *A01L 11/00* (2013.01); *A01L 15/00* (2013.01)
USPC .......................................................... 168/44

(58) Field of Classification Search
CPC ........ A01L 11/00; A01L 15/00; F16M 13/00; F16M 11/10; F16M 2200/08; E04G 25/06; E04G 25/061; E04G 25/04; B60S 9/04
USPC ............ 168/44; 248/371, 393, 158, 161, 159, 248/415, 416, 157, 423, 176.1, 176.3, 33, 248/419, 351, 352, 354.1, 354.3
See application file for complete search history.

(56) References Cited

U.S. PATENT DOCUMENTS

| | | | | | |
|---|---|---|---|---|---|
| 443,346 | A | * | 12/1890 | Allen | 168/44 |
| 1,035,734 | A | * | 8/1912 | Plamondon | 168/48.2 |
| 1,278,628 | A | * | 9/1918 | France et al. | 168/44 |
| 2,558,944 | A | * | 7/1951 | Emmerson | 40/564 |
| 4,167,216 | A | * | 9/1979 | Beaston | 168/44 |
| 7,387,171 | B2 | * | 6/2008 | Keeler | 168/44 |
| 2006/0113090 | A1 | * | 6/2006 | DeCola et al. | 168/44 |
| 2011/0203811 | A1 | * | 8/2011 | Williams, Jr. | 168/44 |

* cited by examiner

Primary Examiner — Son T Nguyen
Assistant Examiner — Kathleen Alker

(57) ABSTRACT

The present invention is a combination of a hoof support stand and a cradle support stand that is to be used by a farrier. A hoof support and a cradle support are both attached to a multipurpose pivot mechanism. The multipurpose pivot mechanism is rotatably attached to an adjustable height stand. The rotatable capability allows a farrier to immediately switch between either the hoof support or the cradle support without needing to remove or attach additional components. The adjustable height stand is removably attached to a base support that is conical to provide optimal stability. A padded support is attached to the multipurpose pivot mechanism so that a horse's fetlock can comfortably and securely rest within the cradle support. The padded support is an improvement to slings used with conventional cradle support stands.

16 Claims, 9 Drawing Sheets

UNIVERSAL FARRIER'S HOOF AND CRADLE SUPPORT STAND

The current application claims a priority to the U.S. Provisional Patent application Ser. No. 61/500,677 filed on Jun. 24, 2011. The current application is filed on Jun. 25, 2012 while Jun. 24, 2012 was on a weekend.

FIELD OF THE INVENTION

The present invention relates generally to a hoof stand apparatus for horses. More particularly, the object of the present invention is to provide a farrier with a multifunction adjustable horseshoeing mechanism that supports both the fetlock and hoof of a horse.

BACKGROUND OF THE INVENTION

The treatment of a horse's hoof or horseshoe can be a tedious and difficult task if the horse's lower limb is not properly supported. This is due to the massive weight of the horse compared to the human that is treating the horse, typically a farrier. Also, the remaining three limbs of the horse must endure an increased load if the limb that the farrier is working on does not receive proper support. Although the horse may be physically capable of withstanding the increased load, the resulting stresses are certainly undesirable. In order to provide the support the lower limb of the hoof or horseshoe that is being treated, the farrier oftentimes uses a hoof support apparatus that comprises two interchangeable pieces. These interchangeable pieces include a hoof stand and a cradle support. Each the hoof stand and the cradle support can fit into the hoof support apparatus, in which each is used for a particular situation. Essentially the hoof stand supports is a soft flat or round ball that supports the bottom of the hoof, so that the top of the hoof can be worked on. The cradle support resembles a U-shaped saddle with an elastic sling across the two apices. The sling supports the fetlock of the horse so that the underside of the hoof becomes exposed. Since the height at which hoof is treated differs from horse to horse, the hoof support apparatus is designed to extend and vary its length. This allows each of the interchangeable pieces to raised or lowered to the appropriate height.

The problem with the current design of this hoof support apparatus is that the farrier must mechanically dislodge the current piece and then replace it with another piece if one of the interchangeable pieces needs to be switched. It does not matter whether the farrier is switching from the hoof support to the cradle support or the cradle support to the hoof support. The farrier must apply considerable time and effort to switch the two pieces.

The present invention solves the problems associated with the current design of the hoof support apparatus a farrier utilizes in order to treat a horse's hoof or horseshoe by configuring both of the interchangeable pieces into a single universal piece. This single universal piece does not require any form of replacement. The present invention allows a farrier to conveniently switch between the hoof support and the cradle support.

DETAIL DESCRIPTIONS OF THE INVENTION

Figure 1:
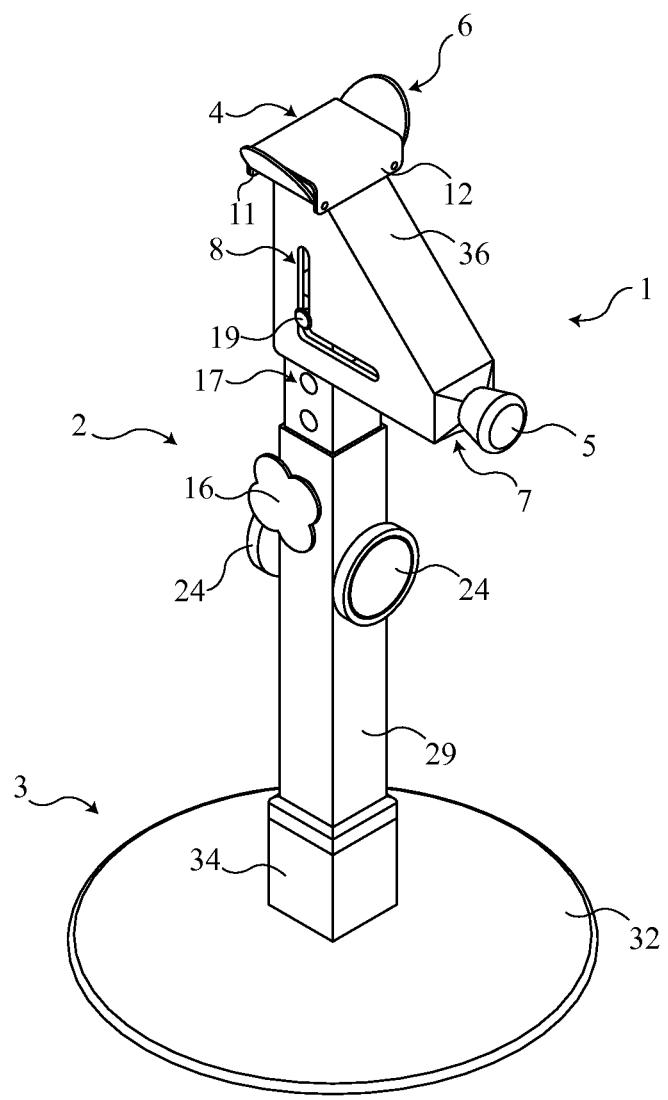
FIG. 1 is a perspective view of the present invention, showing the saddle support configuration.

All illustrations of the drawings are for the purpose of describing selected versions of the present invention and are not intended to limit the scope of the present invention.

The present invention is a universal hoof support and cradle support stand apparatus that a farrier typically utilizes while treating a horse's hoof or horseshoe, as is shown by FIG. 1-FIG. 8. The present invention comprises three integral components, a multipurpose pivot mechanism 1, an adjustable height stand 2, and a base support 3. The multipurpose pivot mechanism 1 includes two interchangeable pieces that is typically necessary while treating the horse's hoof—the hoof support 6 and the cradle support 6. The farrier is able to alternate between the hoof support 5 and the cradle support 6 by simply rotating the multipurpose pivot mechanism 1. The multipurpose pivot mechanism 1 is rotatably attached to the adjustable height stand 2, while the adjustable height stand 2 is secured atop the base support 3.

As is shown by FIG. 1-FIG. 5, the multipurpose pivot mechanism 1 comprises a pivot housing 36, a cradle support 6, a padded support 4, and a hoof support 5. Furthermore, the pivot housing 36 comprises a first pivot end 35, a second pivot end 7, a first L-shaped opening 8, a second L-shaped opening 9, and a pivot slot 10; also, the padded support 4 comprises a first padded support end 11, and a second padded support end 12. Most conventional cradle supports 6 use a sling that is connected across the two apices of the cradle support 6; however, the present invention positions the padded support 4 perpendicularly to this conventional arrangement and eliminates the sling. The conventional positioning of the sling can causes the horse's fetlock to slip out from the cradle support 6. This occurs if the weight of the horse's lower limb does not compress the fetlock into the cradle support 6 deeply enough. In contrary, the perpendicular arrangement of the padded support 4 of the present invention should withhold the horse's fetlock regardless of the weight of the fetlock because the two apices of the cradle support 6 serve as guard rails, ideally. The padded support 4 is a solid supporting structure that partially enwraps the cradle support 6. This solid supporting structure has a padded foundation that allows compression. Therefore, the design of the padded support 4, along with the exposure of the two apices of the cradle support 6, provides a useful improvement to existing cradle support stands.

Both the cradle support 6 and the hoof support 5 are connected to the pivot housing 36. The cradle support 6 is connected to the first pivot end 35, while the hoof support 5 is connected to the second pivot end 7. The first pivot end 35 is positioned adjacently to the second pivot end 7. This allows the farrier to simply rotate the multipurpose mechanism in order to switch between the cradle support 6 and the hoof support 5. As aforementioned, the padded support 4 is attached to the cradle support 6. The first padded support end 11 and the second padded support end 12 are oppositely attached to the cradle support 6 between the two apices of the cradle. The first padded support end 11 and the second padded support end 12 can be attached to the cradle support 6 through a plurality of attachment pieces, such as a simple nut and bolt mechanism that affixes the first padded support end 11 to one side of the cradle support 6, while another nut and bolt mechanism affixes the second padded support end 12 to the opposite side of the cradle support 6. This is the preferred attachment method; however, it should be known that the present invention should not be limited to the aforementioned attachment method or any single attachment method.

The multipurpose pivot mechanism 1 is rotatably attached to the adjustable height stand 2 through the pivot slot 10, the first L-shaped opening 8, and the second L-shaped opening 9. The pivot slot 10 is positioned between the first pivot end 35 and the second pivot end 7, in which the pivot slot 10 is essentially a slot within the pivot housing 36 that a bar can insert into. The first L-shaped opening 8 is oppositely positioned to the second L-shaped opening 9. Both the first L-shaped opening 8 and the second L-shaped opening 9 should be positioned adjacently to the first pivot end 35 and the second pivot end 7. Also, both the first L-shaped opening 8 and the second L-shaped opening 9 should traverse into the pivot slot 10. These L-shaped openings, along with the pivot slot 10, allows the present invention to switch between the hoof support 5 and the cradle support 6 and also allows the either the hoof support 5 or the cradle support 6 to remain rigid while being utilized.

As aforementioned, the multipurpose pivot mechanism 1 is rotatably attached to the adjustable height stand 2. The adjustable height stand 2 is depicted in FIG. 1-FIG. 4, and FIG. 6-FIG. 7, in which the adjustable height stand 2 comprises an extension bar 13, an extension bar encasement 14, a height positioned rod, and a base lock 15. Furthermore, the extension bar 13 comprises a pivot rod 18, a first pivot stopper 19, a second pivot stopper 20, a first extension bar 13 end 21, a second extension bar 13 end 22, and a plurality of lock rod grooves 17; also, the extension bar encasement 14 comprises an encasement opening 26, a first encasement end 27, a second encasement end 28, an open passage 30, a lateral encasement wall 29, a first lock rod hole 23, a base attachment rod 25, and a plurality of attachment devices 24. The adjustable height stand 2 allows the height of the hoof support 5 or the cradle support 6 to be repositioned to stabilize the horse's lower limb. If the horse's limb is angled at an overly obtuse or acute angle, it can be very discomforting to the horse and can make treating the horse difficult for the farrier. The extension bar 13 should partially reside within the extension bar encasement 14. The extension bar encasement 14 attaches to the base support 3, while the extension bar 13 is able to traverse or slide through the open passage 30 to provide the extending functionality. The height positioning rod 16 holds the extension bar 13 at the desired height. The pivoting functionality is further provided by the pivot rod 18, the first pivot stopper 19, and the second pivot stopper 20.

Essentially, the extension bar encasement 14 is an extruded hollow bar that can accept an additional bar within its hollow portion. The encasement opening 26 is positioned atop the first encasement end 27—the first encasement end 27 is positioned oppositely to the second encasement end 28. In order to assemble the adjustable height stand 2, the second extension bar end 22 should first insert into the extension bar encasement 14 through the encasement opening 26. Thereafter, the extension bar 13 should become partially embodied by the extension bar encasement 14 within thpe open passage 30. The open passage 30 is delineated by the lateral encasement wall 29 and the encasement opening 26. Therefore, the extension bar 13 should remain upright because the extension bar 13 is restricted from non-lateral movement by the lateral encasement wall 29. Adjacent to the encasement opening 26 is the first lock rod hole 23, which traverses through the lateral encasement wall 29 into the open passage 30. The base attachment rod 25 is positioned on the second encasement end 28 and is preferably positioned parallel to the lateral encasement wall 29; although, the base attachment rod 25 could be extended from the second encasement end 28 in any particular manner. The base attachment rod 25, along with the base lock 15, is used to secure the extension encasement to the base support 3; however the present invention should not be limited to this particular attaching and securing method and any similar existing or future technology could be used as a means to this end. The plurality of attachment devices 24 are connected to the lateral encasement wall 29, opposite to the open passage 30. In the preferred embodiment of the present invention, these attachment devices 24 should be magnets. Hoof containers, hoof picks or other devices or tools the farrier might use can be affixed to the attachment devices 24. Since most of these tools are manufactured from ferrous metals, magnets could hold or attach the tools to the present invention. This provides the farrier with immediate access to any tools or devices that may be needed while treating a horse. However, the attachment devices 24 could be any similar existing or future technology that holds and/or attach tools or accessories, which a farrier may need to operate.

The multipurpose pivot mechanism 1 pivots about the pivot rod 18, which is positioned between the first extension bar end 21 and the plurality of lock rod grooves 17—the first extension bar end 21 is oppositely positioned to the second extension bar end 22. Both the first L-shaped opening 8 and the second L-shaped opening 9 should be traversed by the pivot rod 18. In order to keep the multipurpose pivot mechanism 1 rigidly secured to pivot rod 18, the first pivot stopper 19 and the second pivot stopper 20 are used. The pivot rod 18 is enclosed by the first pivot stopper 19 and the second pivot stopper 20. The pivot rod 18 is fitted through the first L-shaped opening 8 and the second L-shaped opening 9; the first pivot stopper 19 and the second pivot stopper 20 restrict the multipurpose pivot mechanism 1 from transverse movement along the pivot rod 18. The plurality of lock rod grooves 17 is positioned laterally along the extension bar 13 and should coincide with the first lock rod hole 23 on the extension bar encasement 14. These lock rod grooves 17 could be holes that traverse through the extension bar 13 or recessed grooves along the surface of the extension bar 13 for as long as the height positioned rod can be fitted into the extension bar 13. The extension bar 13 is secured into its desired height by traversing the height positioned rod through the first lock rod hole 23 and into a lock rod groove 17. Repositioning the height should only require an individual to remove the height positioning rod 16 from a lock rod groove 17, and then inserting the height positioning rod 16 into a different lock rod groove 17. This repositioning is shown by comparing FIG. 1 and FIG. 4.

As is shown by FIG. 1-4 and FIG. 8, the base support 3 comprises a concave surface 32, a convex surface 33, a base attachment hole 31 and a stand support slot 34. The base support 3 functions to keep the adjustable height stand 2 upright and stabilized. The conical shape of the base support 3 allows the weight of the horse to be equally distributed through the present invention. In the preferred embodiment of the present invention, the base support 3 is conical, however the present invention should not be limited by such a shape and any form of base structure that can stabilize the present invention could be used. Although, the conical shape currently provides the greatest stability. The concave surface 32 is positioned oppositely to the convex surface 33 to create the conical shape. Atop the concave surface 32 should be the stand support slot 34. The stand support slot 34 should protrude from the concave surface 32 in which the second encasement end 28 can traverse through. In turn the extension bar encasement 14 is restricted from non-lateral movement by the stand support slot 34. The base attachment hole 31 should traverse through both the concave surface 32 and the convex surface 33. Also, the base attachment hole 31 should be positioned within the stand support slot 34. This allows the base attachment rod 25 to traverse through the base attachment hole 31 when the extension bar encasement 14 is inserted within the stand support slot 34. The extension bar encasement 14 is affixed to the base support 3 by securing the base lock 15 to the base attachment rod 25 after it has traversed through the base attachment hole 31. The adjustable height stand 2 can be disassembled from the base support 3 be removing the base lock 15 from the base attachment rod 25. Preferably, the base attachment rod 25 is a threaded bolt and the base lock 15 is a wingnut.

Figure 2:
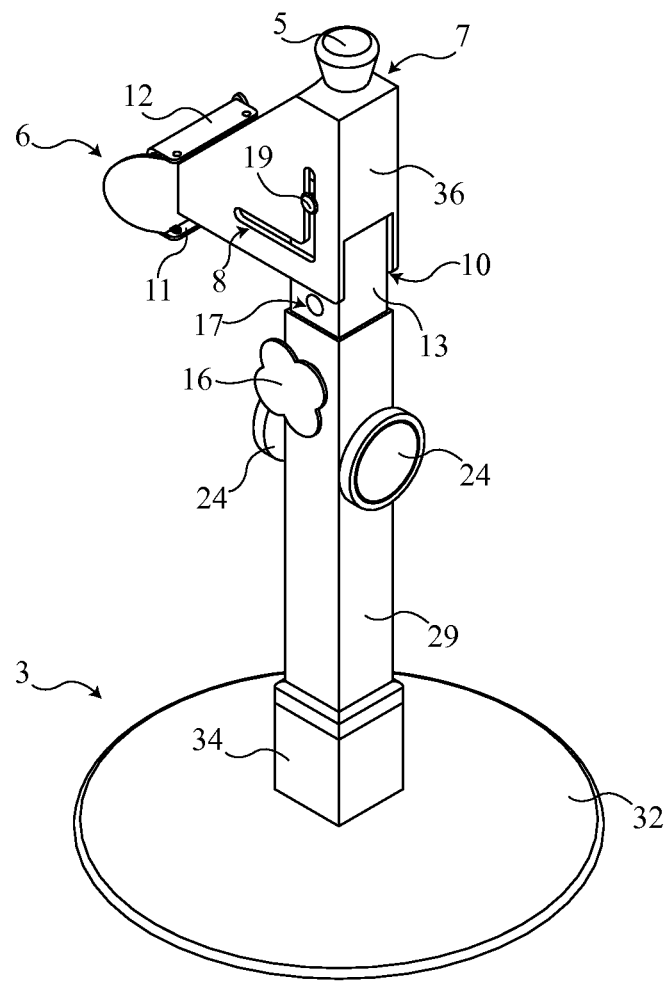
FIG. 2 is a perspective view of the present invention, showing the hoof support configuration.
Figure 3:
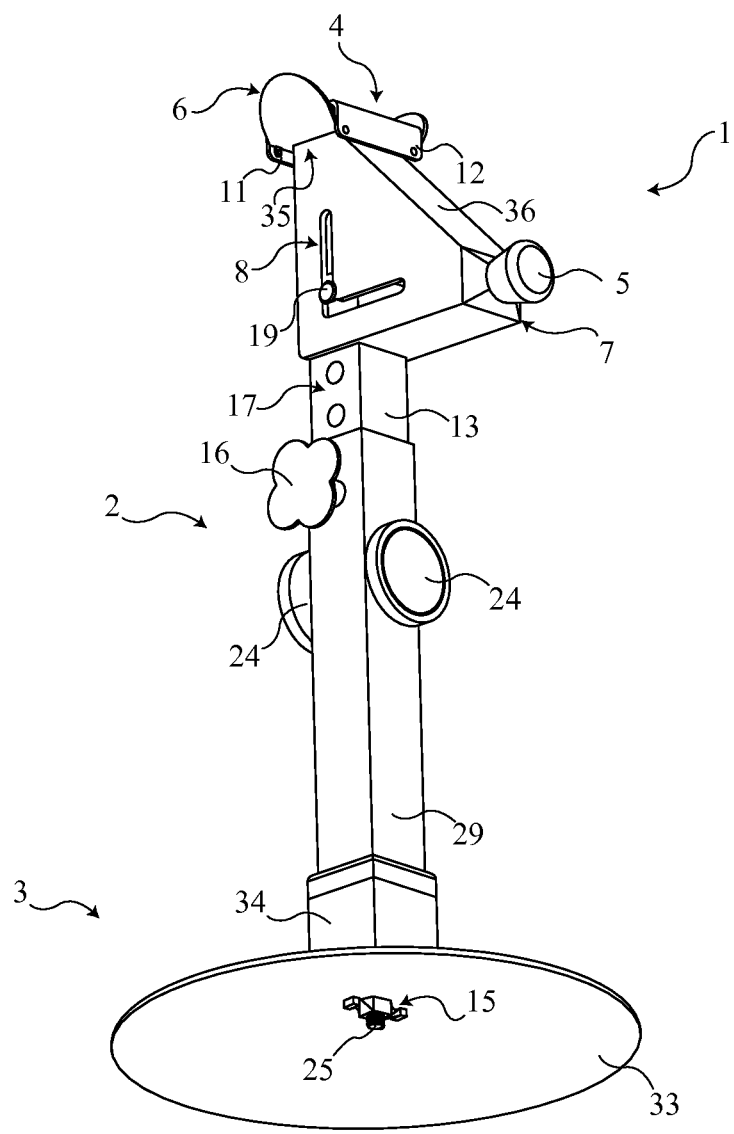
FIG. 3 is a bottom perspective view of the present invention, showing the base lock secured to the adjustable height stand.
Figure 4:
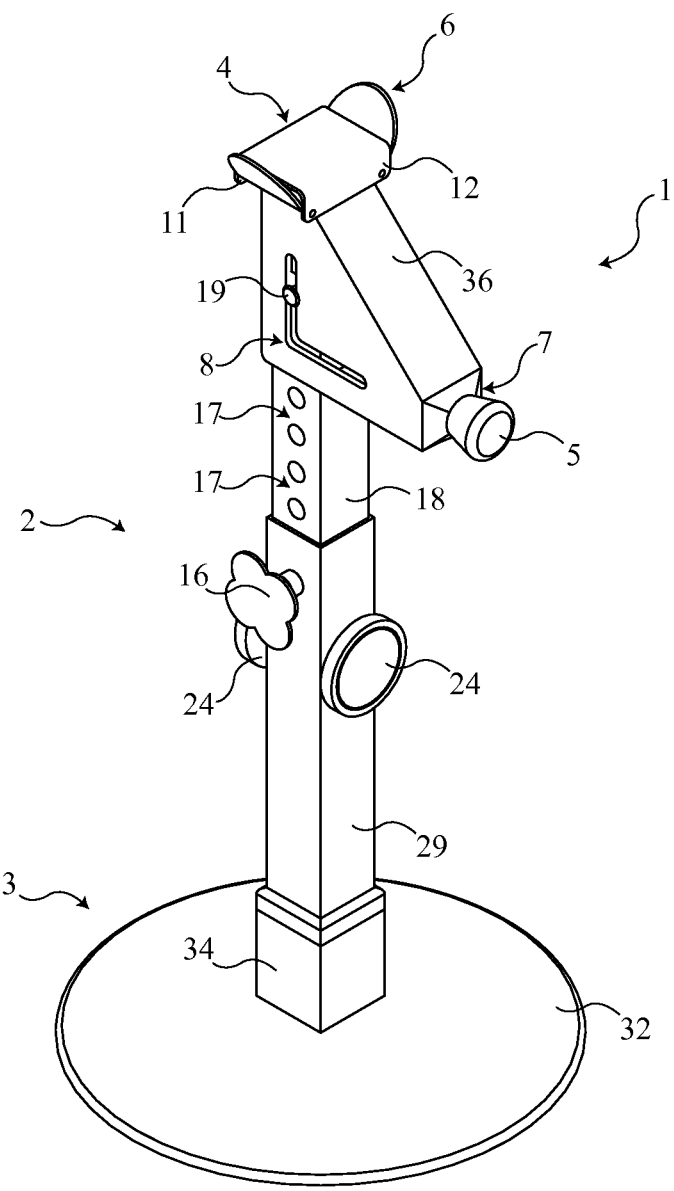
FIG. 4 is a perspective view of the present invention, showing the extension bar repositioned.
Figure 5:
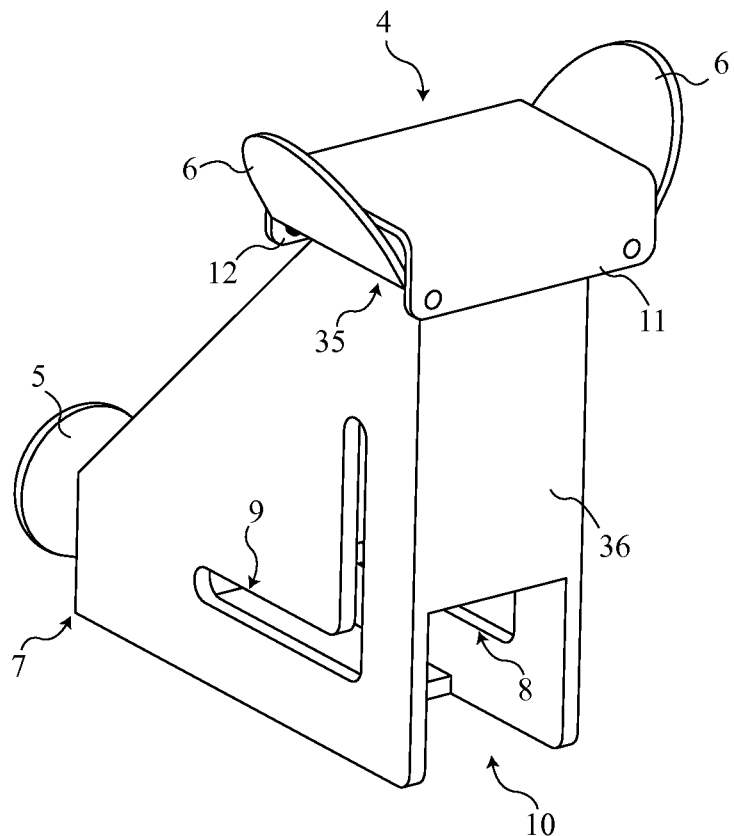
FIG. 5 is a perspective view of the multipurpose pivot mechanism.
Figure 6:
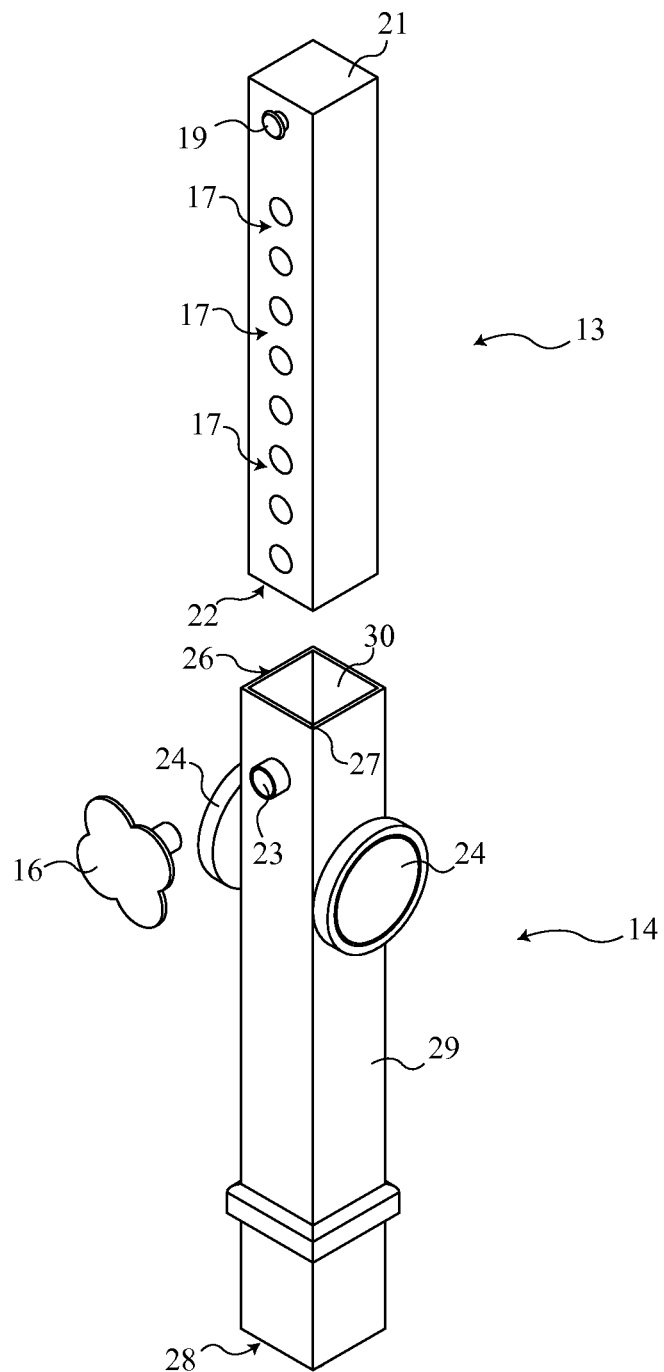
FIG. 6 is an exploded view of the adjustable height stand.
Figure 7:
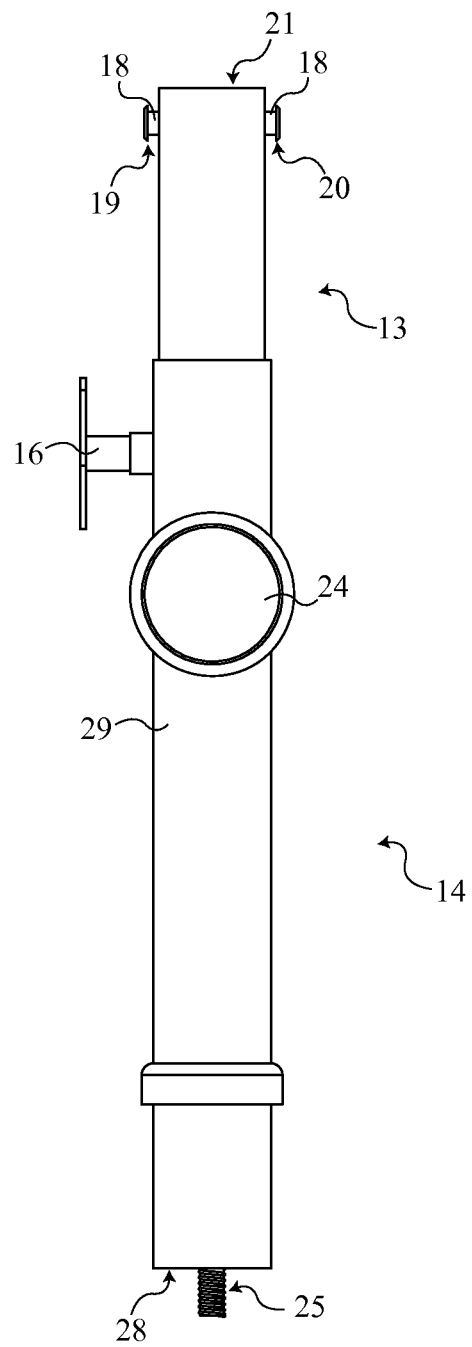
FIG. 7 is a left side view of the adjustable height stand.
Figure 8:
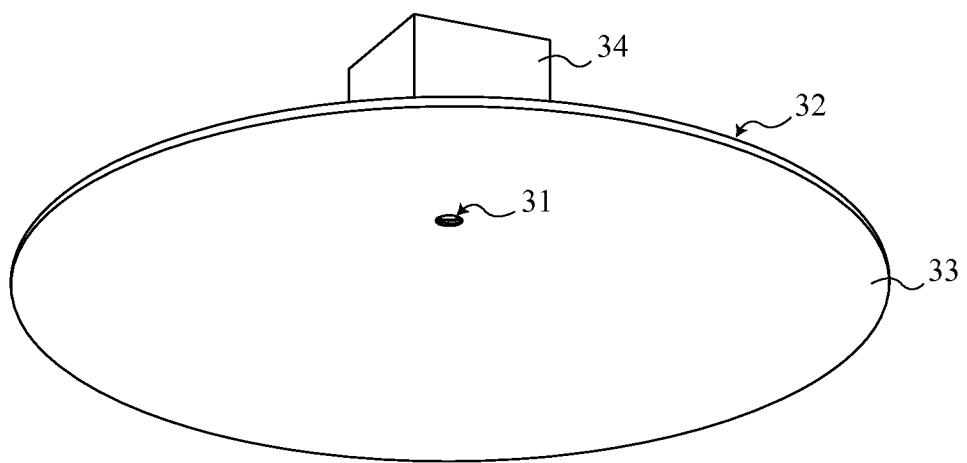
FIG. 8 is a bottom perspective view of the base support.
Figure 9:
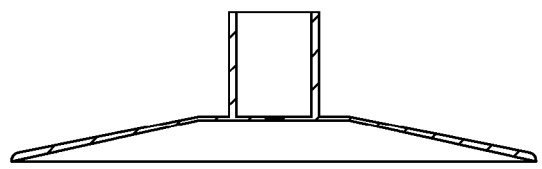
FIG. 9 is a cross sectional view of the base support showing the concave and convex surfaces of the base support. The hatching lines represent section portions of the base support.

If the multipurpose pivot mechanism 1 is oriented so that the cradle support 6 is to be utilized, as is shown in FIG. 1, the farrier should only need to pull and rotate the multipurpose pivot mechanism 1 along the path of the first L-shaped opening 8 and the second L-shaped opening 9. This configuration is shown in FIG. 2. The universality of the multipurpose pivot mechanism 1 should assist the farrier while treating a horse. The more efficiently a farrier can treat the horse's hoof or horseshoe not only provides convenience, but also added safety to the farrier. This is because the horse may at time want to kick its limb and hoof backwards, the likely location of the farrier. Serious injury can be incurred from a horse kick, so the more quickly the farrier can work by quickly interchanging between the hoof support 5 and the cradle support 6, the safer the farrier's job becomes. Therefore, the present invention should become an integral device that is utilized by a farrier.

Although the invention has been explained in relation to its preferred embodiment, it is to be understood that many other possible modifications and variations can be made without departing from the spirit and scope of the invention as hereinafter claimed.

What is claimed is:

1. A farrier's hoof support stand comprises,
a base support;
an adjustable height stand;
a multipurpose pivot mechanism;
the base support comprises a concave surface, a convex surface, a base attachment hole, and a stand support slot;
the adjustable height stand comprises an extension bar, an extension bar encasement, a height positioning rod, and a base lock;
the multipurpose pivot mechanism comprises a pivot housing, a cradle support, a padded support, and a hoof support;
the extension bar comprises a pivot rod, a first pivot stopper, a second pivot stopper, a first extension bar end, a second extension bar end, and a plurality of lock rod grooves;
the extension bar encasement comprises an encasement opening, a first encasement end, a second encasement end, an open passage, a lateral encasement wall, a first lock rod hole, a base attachment rod, and a plurality of attachment devices;
the pivot housing comprises a first pivot end, a second pivot end, a first L-shaped opening, a second L-shaped opening; and a pivot slot; and
the padded support comprises a first padded support end, and a second padded support end.

2. The farrier's hoof support stand as claimed in claim 1 wherein,
the concave surface is positioned oppositely to the convex surface;
the stand support slot being positioned atop the convex surface;
the concave surface and the convex surface both being traversed by the base attachment hole; and
the base attachment hole being positioned within the stand support slot.

3. The farrier's hoof support stand as claimed in claim 1 wherein,
the first extension bar end being positioned oppositely to the second extension bar end;
the plurality of lock rod grooves being laterally positioned between the first extension bar end and the second extension bar end;
the pivot rod being positioned between the first extension bar end and the plurality of lock rod grooves;
the first pivot stopper and the second pivot stopper each enclosing the pivot rod; and
the first pivot stopper being positioned oppositely to the second pivot stopper.

4. The farrier's hoof support stand as claimed in claim 1 wherein,
the first encasement end being positioned oppositely to the second encasement end;
the encasement opening being atop the first encasement end;
the open passage being delineated by the encasement opening and the lateral encasement wall;
the first lock rod hole being located near the first encasement end;
the lateral encasement wall being traversed by the first lock rod hole;
the base attachment rod being positioned on the second encasement end; and
each of the plurality of attachment devices being connected to the lateral encasement wall.

5. The farrier's hoof support stand as claimed in claim 1 wherein,
the first pivot end being positioned adjacently to the second pivot end;
the cradle support being connected to the first pivot end;
the hoof support being connected to the second pivot end;
the pivot slot being positioned between the first pivot end and the second pivot end;
the first L-shaped opening being positioned oppositely to the second L-shaped opening; and
the padded support being attached to the cradle support.

6. The farrier's hoof support stand as claimed in claim 5 wherein,
the first L-shaped opening and the second L-shaped opening both traversing into the pivot slot;
the first padded support end being attached to the cradle support; and
the second padded support end being attached to the cradle support oppositely to the first padded support end.

7. The farrier's hoof support stand as claimed in claim 1 wherein, the extension bar encasement being removably attached to the base support through the base attachment rod, the base attachment hole, the base lock, and the stand support slot;

the multipurpose pivot mechanism being pivotally attached to the extension bar through the pivot rod, the first pivot stopper, the second pivot stopper, the first L-shaped opening, and the second L-shaped opening; and the extension bar being attached to the extension bar encasement.

8. The farrier's hoof support stand as claimed in claim 7 wherein, the second encasement end being inserted into the stand support slot;

the base attachment hole being traversed by the base attachment rod; and the base lock being affixed to the base attachment rod, wherein the base lock is positioned adjacently to the convex surface.

9. The farrier's hoof support stand as claimed in claim 7 wherein, the first extension bar end being housed within the pivot slot;

the first L-shaped opening and the second L-shaped opening both being traversed by the pivot rod; and the first pivot stopper and the second pivot stopper each being secured to the pivot rod.

10. The farrier's hoof support stand as claimed in claim 7 wherein, the encasement opening being traversed by the second extension bar end; and the second extension bar end being housed by the lateral encasement wall.

11. A farrier's hoof support stand comprises, a base support;

an adjustable height stand;

a multipurpose pivot mechanism;

the base support comprises a concave surface, a convex surface, a base attachment hole, and a stand support slot;

the adjustable height stand comprises an extension bar, an extension bar encasement, a height positioning rod and a base lock;

the multipurpose pivot mechanism comprises a pivot housing, a cradle support, a padded support, and a hoof support;

the extension bar comprises a pivot rod, a first pivot stopper, a second pivot stopper, a first extension bar end, a second extension bar end, and a plurality of lock rod grooves;

the extension bar encasement comprises an encasement opening, a first encasement end, a second encasement end, an open passage, a lateral encasement wall, a first lock rod hole, a base attachment rod, and a plurality of attachment devices;

the pivot housing comprises a first pivot end, a second pivot end, a first L-shaped opening, a second L-shaped opening, and a pivot slot;

the padded support comprises a first padded support end, and a second padded support end;

the second encasement end being inserted into the stand support slot;

the base attachment hole being traversed by the base attachment rod; and the base lock being affixed to the base attachment rod, wherein the base lock is positioned adjacently to the convex surface.

12. The farrier's hoof support stand as claimed in claim 11 wherein, the concave surface is positioned oppositely to the convex surface;

the stand support slot being positioned atop the convex surface;

the concave surface and the convex surface both being traversed by the base attachment hole; and the base attachment hole being positioned within the stand support slot.

13. The farrier's hoof support stand as claimed in claim 11 wherein, the first extension bar end being positioned oppositely to the second extension bar end;

the plurality of lock rod grooves being laterally positioned between the first extension bar end and the second extension bar end;

the pivot rod being positioned between the first extension bar end and the plurality of lock rod grooves;

the first pivot stopper and the second pivot stopper each enclosing the pivot rod; and the first pivot stopper being positioned oppositely to the second pivot stopper.

14. The farrier's hoof support stand as claimed in claim 11 wherein, the first encasement end being positioned oppositely to the second encasement end;

the encasement opening being atop the first encasement end;

the open passage being delineated by the encasement opening and the lateral encasement wall;

the first lock rod hole being located near the first encasement end;

the encasement wall being traversed by the first lock rod hole;

the base attachment rod being positioned on the second encasement end; and each of the plurality of attachment devices being connected to the lateral encasement wall.

15. The farrier's hoof support stand as claimed in claim 11 wherein, the first pivot end being positioned adjacently to the second pivot end;

the cradle support being connected to the first pivot end;

the hoof support being connected to the second pivot end;

the pivot slot being positioned between the first pivot end and the second pivot end;

the first L-shaped opening being positioned oppositely to the second L-shaped opening;

the padded support being attached to the cradle support;

the first L-shaped opening and the second L-shaped opening both traversing into the pivot slot;

the first L-shaped opening being positioned oppositely to the second L-shaped opening;

the first padded support end being attached to the cradle support; and the second padded support end being attached to the cradle support oppositely to the first padded support end.

16. The farrier's hoof support stand as claimed in claim 11 wherein, the first extension bar end being housed within the pivot slot;

the first L-shaped opening and the second L-shaped opening both being traversed by the pivot rod;

the first pivot stopper and the second pivot stopper each being secured to the pivot rod;

the extension bar being inserted within the open passage; and the second extension bar end being housed by the lateral encasement wall.

* * * * *